(12) United States Patent
Falk et al.

(10) Patent No.: US 9,026,806 B2
(45) Date of Patent: May 5, 2015

(54) METHOD AND DEVICE FOR PROVIDING A CRYPTOGRAPHIC KEY FOR A FIELD DEVICE

(75) Inventors: Rainer Falk, Poing (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

(21) Appl. No.: 13/979,729

(22) PCT Filed: Dec. 15, 2011

(86) PCT No.: PCT/EP2011/072895
§ 371 (c)(1),
(2), (4) Date: Jul. 15, 2013

(87) PCT Pub. No.: WO2012/095235
PCT Pub. Date: Jul. 19, 2012

(65) Prior Publication Data
US 2013/0311791 A1    Nov. 21, 2013

(30) Foreign Application Priority Data
Jan. 14, 2011   (DE) .......................... 10 2011 002 703

(51) Int. Cl.
| | | |
|---|---|---|
| G06F 12/14 | (2006.01) | |
| G06F 21/72 | (2013.01) | |
| G06F 21/55 | (2013.01) | |
| G06F 21/86 | (2013.01) | |
(Continued)

(52) U.S. Cl.
CPC ................ *G06F 21/72* (2013.01); *G06F 21/55* (2013.01); *G06F 21/86* (2013.01); *H04L 63/061* (2013.01); *H04L 67/12* (2013.01)

(58) Field of Classification Search
None
See application file for complete search history.

(56) References Cited

U.S. PATENT DOCUMENTS 5,159,629 A  * 10/1992 Double et al. ................ 713/194
5,671,146 A      9/1997 Windel et al.
(Continued)

FOREIGN PATENT DOCUMENTS

| DE | 4344476 A1 | 6/1995 |
|---|---|---|
| DE | 102007016170 A1 | 10/2008 |
(Continued)

OTHER PUBLICATIONS

Linchun Li et al: "ACKDs: An Authenticated Combinatorial Key Distribution Scheme for Wireless Sensor Networks", Software Engineering, Artificial Intelligence, Networking, and Parallel/Distributed Computing, 2007. SNPD 2007. Eighth Acis International Conference on, IEEE, Piscataway, NJ, USA, Jul. 1, 2007, pp. 262-267, XP031124924, ISBN: 978-0-7695-2909-7.

(Continued)

*Primary Examiner* — Kaveh Abrishamkar
(74) *Attorney, Agent, or Firm* — Laurence A. Greenberg; Werner H. Stemer; Ralph E. Locher

(57) ABSTRACT

A security device and a method provide a cryptographic key for a field device. The security device is connected to at least one tamper sensor which is associated with the field device and which, when a physical manipulation carried out on the field device is detected, a manipulation message is emitted. The cryptographic key is only provided to the field device by the security device if the security device does not receive a manipulation message from the tamper sensors associated with the field device.

15 Claims, 3 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 5,805,711 | A | 9/1998 | Windel et al. |
| 7,154,275 | B2 * | 12/2006 | Zank et al. ............... 324/457 |
| 7,170,201 | B2 * | 1/2007 | Hamel et al. ............. 307/151 |
| 8,188,860 | B2 | 5/2012 | Haid |
| 8,359,009 | B2 | 1/2013 | Schroeder et al. |
| 8,586,925 | B2 * | 11/2013 | Willden ................. 250/338.1 |
| 2005/0132209 | A1 * | 6/2005 | Hug et al. ................. 713/189 |
| 2006/0109114 | A1 * | 5/2006 | Watts et al. .............. 340/568.1 |
| 2007/0205881 | A1 * | 9/2007 | Breed ....................... 340/447 |
| 2008/0244217 | A1 | 10/2008 | Baum et al. |
| 2009/0102643 | A1 | 4/2009 | Haid |
| 2009/0282246 | A1 * | 11/2009 | Gunther .................... 713/168 |
| 2010/0306544 | A1 * | 12/2010 | Lionetti et al. ............ 713/171 |
| 2011/0181399 | A1 * | 7/2011 | Pollack et al. ........... 340/10.33 |

FOREIGN PATENT DOCUMENTS

| | | |
|---|---|---|
| DE | 202007018769 U1 | 4/2009 |
| DE | 102008051158 A1 | 5/2009 |
| DE | 102007055248 A1 | 6/2009 |
| WO | 2009/077014 A1 | 6/2009 |

OTHER PUBLICATIONS

Jamshaid, K, et al., "SEKEN: secure and efficient key exchange for sensor networks", International Conference on Performance, Computing, and Communications, 2004, pp. 415-422, URL: http://newslab.cs.wayne.edu/SEKEN.pdf.

Krauss, C., et al., "Handling insider attacks in wireless sensor networks", Information Security Technical Report, Elsevier Advanced Technology, pp. 165-172, Aug. 2008, vol. 13, No. 3, URL: http://tuprints.ulb.tu-darmstadt.de/2158/1/Dissertation_ckrauss.pdf.

Weingart, S., et al., "Physical security devices for computer sybsystems: A survey of attacks and defenses", Cryptographic Hardware and Embedded Systems, 2nd International Workshop, CHES Proceedings, pp. 302-317, Aug. 17-18, 2000, Springer Verlag, Berlin, Germany, URL: http://www.atsec.com/downloads/pdf/phy_sec_dev.pdf.

Treytl, A., et al., "Practical Issues on Key Distribution in Power Line Networks", 10th IEEE International Conference on Emerging Technologies and Factory Automation, pp. 83-90, Sep. 2005, XP010905471, Piscataway, New Jersey, USA, URL: http://www.iiss.oeaw.ac.at/files/pub/2005-ETFA05-Practical-Issues-on-Key-Distribution-in-Power-Line-Networks.pdf.

Koc, C., et al., "Cryptographic hardware and embedded systems: Pre-proceedings of the Second International Workshop", Lecture Notes in Computer Science, pp. 1-365, Aug. 17-18, 2000, vol. 1965, Springer Verlag, Berlin, Heidelberg, Germany, New York, NY, USA (submitted in parts i-iv).

* cited by examiner

METHOD AND DEVICE FOR PROVIDING A CRYPTOGRAPHIC KEY FOR A FIELD DEVICE

BACKGROUND OF THE INVENTION

Field of the Invention

The invention relates to a method and a device for providing a cryptographic key for a field device, in particular an industrial field device.

Industrial field devices that perform control functions, for example controlling a valve, in many cases have sensors and actuators or other subsystems. In order to safeguard data communication from manipulation attempts it is necessary to store cryptographic keys or credentials on the field devices in a protected manner. For field devices of such kind that are often installed in areas where they are accessible to attackers it is necessary to safeguard said devices from physical manipulations. That is why sensitive data, cryptographic keys in particular, has in the case of conventional field devices hitherto been stored in an area offering a certain degree of local protection against manipulation, for example in a specially protected housing fitted with a wire mesh, for example, or a conductorized security foil, which is to say a wire-mesh sensor system which, when the housing is manipulated, registers said manipulation and where necessary causes the stored data to be automatically erased. Sensors of such kind are referred to also as tamper sensors. What, therefore, is generally known is tamper monitoring by means of tamper sensors which, however, as a rule require a power supply. Physical protective measures are known that make tampering difficult, for example special housings or molded modules. However, local tamper monitoring of such kind requires a continuous power supply or, as the case may be, a buffer battery. Tamper monitoring will therefore be put out of action if the electrical energy provided by the battery runs down. This conventional approach furthermore requires the field devices to be individually provided with tamper monitoring or tamper protection of such kind, with the result that the technical overhead is relatively high.

BRIEF SUMMARY OF THE INVENTION

It is hence an object of the present invention to provide a method and a device offering effective tamper or manipulation protection for field devices while at the same time avoiding the disadvantages of the conventional tamper protection/monitoring equipment employed in the prior art.

Said object is achieved according to the invention by means of a security device having the features as claimed.

The invention makes a security device available for providing a cryptographic key for a field device, wherein the security device is connected to at least one tamper sensor that is assigned to the field device and will emit a manipulation message upon detecting a physical manipulation carried out on the field device, wherein the cryptographic key is made available to the field device by the security device only if the security device does not receive a manipulation message from the tamper sensors assigned to the field device.

The security device is not attached to the field device requiring to be monitored but is connected to the field device via a network, which is to say that the tamper monitoring of the field device is accomplished not locally but remotely by means of a security device situated at a distance. A continuous or permanent power supply by means of, for example, a buffer battery in the field device is therefore not required for the inventive tamper monitoring. Moreover the technical overhead involved in the case of the inventive tamper monitoring by means of the security device according to the invention is relatively low because the respective field devices do not have to be provided with local tamper protection.

In a possible embodiment variant of the inventive security device the tamper sensors are connected to the security device wirelessly or on a hardwired basis.

Connecting the tamper sensors to the security device wirelessly makes installing the field device a simple operation and consequently reduces the technical effort required for implementation.

In another possible embodiment variant of the inventive security device the tamper sensors are attached directly to the field device or integrated in the field device.

In another possible embodiment variant of the inventive security device the tamper sensors are attached to a closed housing or a control cabinet in which the respective field device is located.

In another possible embodiment variant of the inventive security device the cryptographic key is made available to the respective field device when it logs in to a network only after successful authentication to the security device.

In another possible embodiment variant of the inventive security device the cryptographic key that is made available is used by the field device for encrypting or decrypting messages which the field device exchanges with other field devices or with a gateway node of the network.

It is furthermore possible for the cryptographic key that is made available to be used by the field device to decrypt data that is stored locally in the field device.

In another possible embodiment variant of the inventive security device it has a reading unit that receives messages from the tamper sensors wirelessly.

In a possible embodiment variant of the inventive security device the tamper sensors are active sensors that have their own power supply.

In an alternative preferred embodiment variant the tamper sensors are passive sensors that do not have their own power supply.

The tamper sensors serve to register physical manipulations that can be carried out on the field device by an attacker.

In a possible embodiment variant said tamper sensors are electric or magnetic switches for detecting when a housing or control cabinet is opened.

It is furthermore possible for the tamper sensors to be sensors for registering electromagnetic radiation.

The sensors can in particular be light sensors or photoelectric sensors.

In another possible embodiment variant the tamper sensors also include sensors for registering ion beams.

In another possible embodiment variant the tamper sensors also have temperature sensors for registering a change in temperature.

In another possible embodiment variant the tamper sensors also have proximity sensors.

In another possible embodiment variant the tamper sensors also have vibration sensors that detect a change in position.

In another possible embodiment variant the tamper sensors also have wire meshes that are provided in a molded jacket or a molded housing.

Other types of tamper sensors that can have a physical effect occurring in the event of a physical manipulation are possible.

Passive tamper sensors that do not require their own power supply are preferably used for the inventive security device.

In a possible embodiment variant of the inventive security device said passive tamper sensors in each case obtain their energy for generating the manipulation message to the security device from energy produced during the physical manipulation. If, for example, a tamper sensor is located on a glass pane that is smashed with a hammer, in a possible embodiment variant a tamper sensor can obtain the energy needed for generating the manipulation message from the mechanical energy produced during the hammer blow.

In an alternative embodiment variant the passive tamper sensors in each case obtain their energy for generating the manipulation message to the security device from a field, in particular an electromagnetic field, radiated by the security device.

In a possible embodiment of the inventive security device the tamper sensors associated with the field device are coded in a digital device certificate of the field device.

The invention furthermore makes available a method for providing a cryptographic key for a field device, wherein the cryptographic key is made available to the field device by a security device only if within a specified period of time the security device does not receive from any tamper sensor assigned to the field device a manipulation message reporting a physical manipulation carried out on the field device.

In a possible embodiment variant of the inventive method the cryptographic key will not be made available to the field device until the field device has authenticated itself to the security device.

In another possible embodiment variant of the inventive method the tamper sensors obtain the energy for generating a manipulation message from energy produced during the manipulation or from a field radiated by the security device.

In a possible embodiment variant of the inventive method the cryptographic key that is made available is a session key which is used by the field device for communicating with another field device or with a gateway of a network.

In another possible embodiment variant of the inventive method, the field device uses the provided cryptographic key to decrypt data stored in the field device in encrypted form.

Possible embodiment variants of the inventive security device and of the inventive method for providing a cryptographic key for a field device are described in more detail below with reference to the attached figures, in which:

DESCRIPTION OF THE INVENTION

Figure 1:
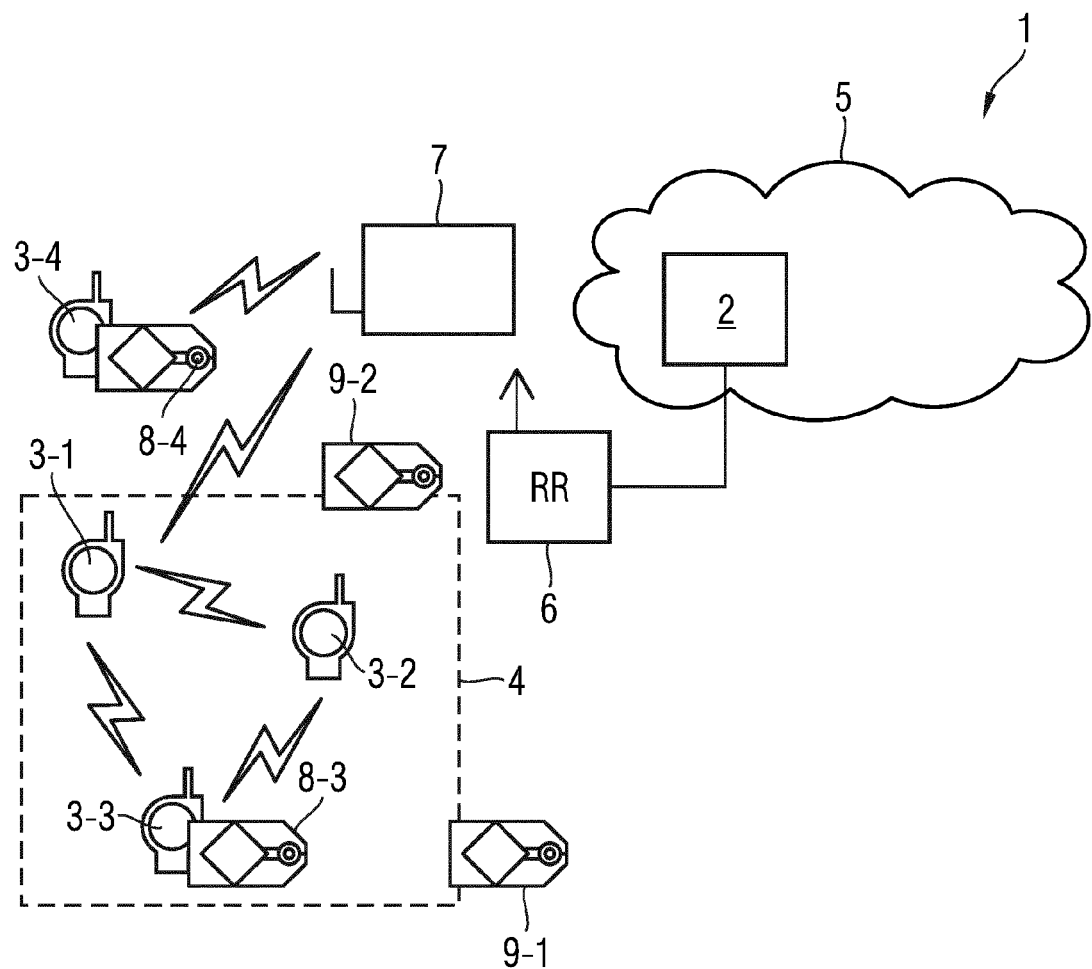
FIG. 1 shows an exemplary embodiment of a system having a security device for providing cryptographic keys for field devices according to the invention.

As can be seen from FIG. 1, the system 1 shown in FIG. 1 has a security device 2 for providing cryptographic keys or credentials for different field devices 3-$i$. In the example shown, three field devices 3-1, 3-2, 3-3 are housed in a control cabinet 4 indicated by a dashed outline. The security device 2 is connected to a reading device 6 via a network 5. The reading device 6 can be, for example, an RFID reader (RR) that is connected to the security device 2 via the network 5. In the exemplary embodiment shown in FIG. 1, the security device 2 is furthermore connected via the network 5 to a gateway 7 which can communicate with the different field devices 3-$i$. In the exemplary embodiment shown in FIG. 1, a field device 3-4 is located outside the control cabinet 4. The field devices can be, for example, sensor nodes of a sensor network. In the exemplary embodiment shown, some sensor nodes or field devices have their own tamper sensors 8-$i$. Thus, for example, the field device 3-3 inside the control cabinet 4 has its own tamper sensor 8-3. The field device 3-4 outside the control cabinet 4 furthermore has an associated tamper sensor 8-4 of its own. Further tamper sensors 9-1, 9-2 are attached to the control cabinet 4 in the exemplary embodiment shown. Said tamper sensors 9-1, 9-2 are thus not attached to field devices 3-$i$ directly but are mounted on a housing or a control cabinet 4 in which the field devices are located. Two tamper sensors 9-1, 9-2 of such kind are attached to the control cabinet 4 in the exemplary embodiment shown in FIG. 1. The tamper sensors 8-$i$, 9-$i$ can be interrogated by the reading device 6 in the exemplary embodiment shown in FIG. 1. The tamper sensors 8-$i$, 9-$i$ can be, for example, passive tamper sensors which obtain their energy for generating a manipulation message from, for example, an electromagnetic field radiated by the reading device 6. The tamper sensors 8-3, 8-4 are attached directly to the field device requiring to be monitored or to the sensor nodes 3-3, 3-4, in which case they can be attached to the housing of the field device or integrated in the field device itself. The tamper sensors 9-1, 9-2 are attached for example to glass panes of a control cabinet 4 and register a physical manipulation carried out on the respective glass pane of the control cabinet 4. The tamper sensors 8-$i$, 9-$i$ communicate wirelessly with the reading device 6 in the exemplary embodiment shown in FIG. 1. Alternatively, the tamper sensors can also transmit a manipulation message to the security device 2 via a hardwired connection. The security device 2 is connected to at least one tamper sensor assigned to the respective the field device 3-$i$. It is therein possible for a field device to be assigned one or more tamper sensors. For example, the sensor node 3-3 in the exemplary embodiment shown has also been assigned the two tamper sensors 9-1, 9-2 in addition to the directly attached tamper sensor 8-3 because the field device 3-3 is located inside the control cabinet 4 which for its part is monitored by the two tamper sensors 9-1, 9-2. The field device 3-1 or the sensor node that does not have any tamper sensors of its own has essentially been assigned the tamper sensors 9-1, 9-2 of the control cabinet 4. The sensor node 3-4 which is provided outside the control cabinet 4 has its own tamper sensor 8-4, which has likewise been assigned to it.

In a possible embodiment variant, the security device 2 has a data memory and manages a list of the tamper sensors assigned to the respective field devices 3-$i$. Upon detecting a physical manipulation carried out on a field device 3-$i$, a tamper sensor assigned to the field device 3-$i$ issues a manipulation message, for example a tamper event message TE, which is for example forwarded via the reading device 6 to the security device 2. If a field device 3-$i$ logs in to the security device 2, for example via the gateway 7, necessary cryptographic keys or credentials will be made available to the respective field device 3-$i$ by the security device 2 only if the security device 2 has up until then not received a manipulation message or tamper event message TE from any of the tamper sensors assigned to the field device 3-$i$. In a variant, the cryptographic key or credential already made available to a field device 3-$i$ will be revoked if the security device 2 receives a manipulation message or tamper event message TE from a tamper sensor assigned to the field device 3-$i$. The security device 2 can for that purpose make available a revoke message assigned to the key or credential that has been made available. In a possible embodiment variant the cryptographic keys are made available to the respective field device 3-*i* for a certain period of time only and will expire after a certain period of time has elapsed. In a possible embodiment variant the cryptographic keys are made available to the field devices 3-*i* by the security device 2 when they log in to a network only after the respective field device 3-*i* has successfully authenticated itself to the security device 2. The cryptographic key that is made available can be, for example, a session key SK. Said cryptographic key that is made available can be used by the field device 3-*i* for encrypting or decrypting messages exchanged between the field devices. It is furthermore possible for the cryptographic key that is made available to be used also for decrypting data stored in the field device 3-*i* in encrypted form. The tamper sensors shown in FIG. 1 can be all kinds of tamper sensors that detect different physical manipulations, in particular electric or magnetic switches, sensors for registering electromagnetic radiation, sensors for registering ion beams, temperature sensors, proximity sensors, motion sensors, vibration sensors, or wire-mesh sensors. Passive tamper sensors that do not need their own power supply are preferably used as tamper sensors 8-*i*, 9-*i*.

In a preferred embodiment variant, the passive tamper sensors 8-*i*, 9-*i* obtain their energy for generating a manipulation message to the security device 2 from energy produced during the physical manipulation. If, for example, the glass pane of the control cabinet 4 on which the tamper sensor 9-*i* is located is smashed, in a possible embodiment variant said tamper sensor can obtain energy allowing it to transmit a manipulation message or tamper event message TE to the reading device 6 from the mechanical vibrations.

In an alternative embodiment variant the passive tamper sensors obtain their energy for generating the manipulation message to the security device 2 from a radiated electromagnetic field emitted by, for example, the reading device 6.

The security device 2 serves to provide—which is to say supply or agree—a cryptographic key or credentials for a field device 3-*i* having a communication interface, for example Ethernet, IP, WLAN, or suchlike. The field device 3-*i* therein authenticates itself preferably to the security device 2. The field device 3-*i* requires a cryptographic key for its operation. Preferably the cryptographic key is provided by the security device 2 in this case when the respective field device logs in to a network, for example via an Ethernet or a radio interface, in particular WLAN, RFID, or IEEE802.15.4.

The security device 2 additionally monitors external tamper or manipulation sensors, wherein said tamper sensors are each assigned to one or more field devices. A cryptographic key or credential will be made available to a field device 3-*i* by the security device 2 only if no manipulation or tamper sensor relevant to the corresponding field device 3-*i* detects a tamper event TE or has detected one during a past monitoring period.

The manipulation or tamper sensors can be connected wirelessly to the security device 2. It is therein possible for the tamper sensors to communicate wirelessly, for example via RFID or IEEE802.15.4. The tamper sensors can be in particular passive tamper sensors, which is to say sensors that do not have their own power supply or battery buffers. The passive tamper sensors can obtain the energy they need to operate from a field emitted by the security device 2. The field can therein be a field of an RFID reader or a field emitted via an antenna, without a reading device being connected. It is furthermore possible for the tamper sensors to obtain their energy requirements from the event requiring to be monitored itself, meaning, for example, that an intrusion sensor or tamper sensor can be embodied as an electric sensor in the case of which electrical energy is generated when pressure is applied. Said generated energy can be used for communication by the tamper sensor. A tamper sensor of such kind can be present as a separate sensor for example for mounting on a maintenance cover. It is furthermore possible for a tamper sensor of such kind to have been integrated in a field device 3-*i*.

In a possible embodiment variant, when a field device communicates with the security device 2, information about which tamper or manipulation sensors are to be monitored by the security device 2 for said field device 3-*i* can be transmitted by the field device to the security device 2. Specifically for tamper sensors integrated in the field device, said information can be coded into a digital device certificate of the field device 3-*i*. Alternatively, the security device 2 can also retrieve said data from a central database that is made available for example on the basis of a device identification, for instance via a digital certificate.

In a possible embodiment variant, the field device 3-*i* will erase the secret or sensitive data stored in the field device as soon as the field device 3-*i* switches to an inactive operational state, in particular after detecting a physical manipulation on the respective field device.

Thus, from the viewpoint of the field device 3-*i*, which in the meantime assumed an inactive operational state without a power supply, for example, said field device will later be able to interrogate the security device 2 to determine whether the associated manipulation or tamper sensors have at no time, meaning at any time throughout the monitoring period, detected any manipulation. If no manipulation has taken place, the field device 3-*i* will then receive from the security device 2 secret parameters or cryptographic keys which it needs to resume its normal operation.

Figure 2:
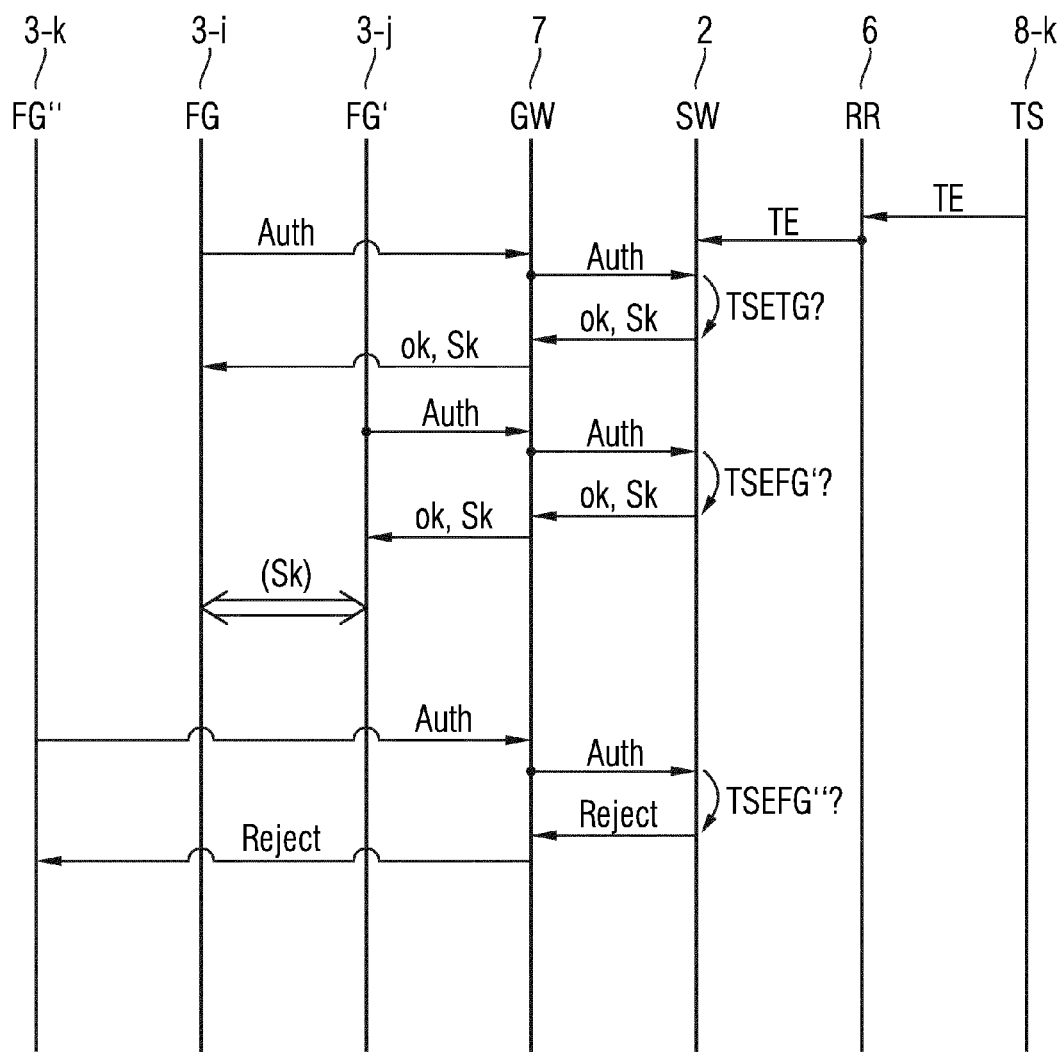
FIG. 2 is a signal diagram showing how the inventive method for providing cryptographic keys for a field device functions.

FIG. 2 shows a signal diagram intended to explain the inventive method for providing a cryptographic key for a field device 3-*i*. In the exemplary embodiment shown, the security device 2 monitors a plurality of different tamper sensors 8-*i* assigned to different field devices 3-*i*, 3-*j*. In the example shown in FIG. 2, the security device 2 first receives a manipulation message or tamper event message TE from a tamper sensor 8-*k* assigned to a field device 3-*k*.

Another field device 3-*i* then transmits an authentication message, which is encrypted for example by means of a device key of the device, to the security device 2 via the gateway 7 in order to register itself or log in. The security device 2 checks the received login message to determine whether the logging-in node or field device 3-*i* is authorized to use the network. The security device furthermore checks for the presence of a manipulation message on a tamper sensor assigned to the field device 3-*i*. If no manipulation message is present and the authentication of the field device 3-*i* is successful, the inquiring field device 3-*i* will receive an "Accept" or OK message and an associated session key SK for safeguarding its communication within the network. In like manner another field device 3-*j* logs in to the security device 2 in the example shown in FIG. 2 and likewise receives a session key SK. In a possible embodiment variant, the session key SK is valid throughout the network. The two field devices 3-*i*, 3-*j* will then be able to communicate with each other in a cryptographically protected manner with the aid of the received session key SK, as shown in FIG. 2.

If, in the example shown in FIG. 2, another node or field device 3-*k* logs in to the security device 2, the security device 2 will detect that a manipulation message or tamper event message TE is already present for said node and reject the node or field device 3-*k*. In a possible embodiment variant the rejection message (Reject) at the inquiring node 3-*k* will automatically trigger the erasing of sensitive data.

Figure 3:
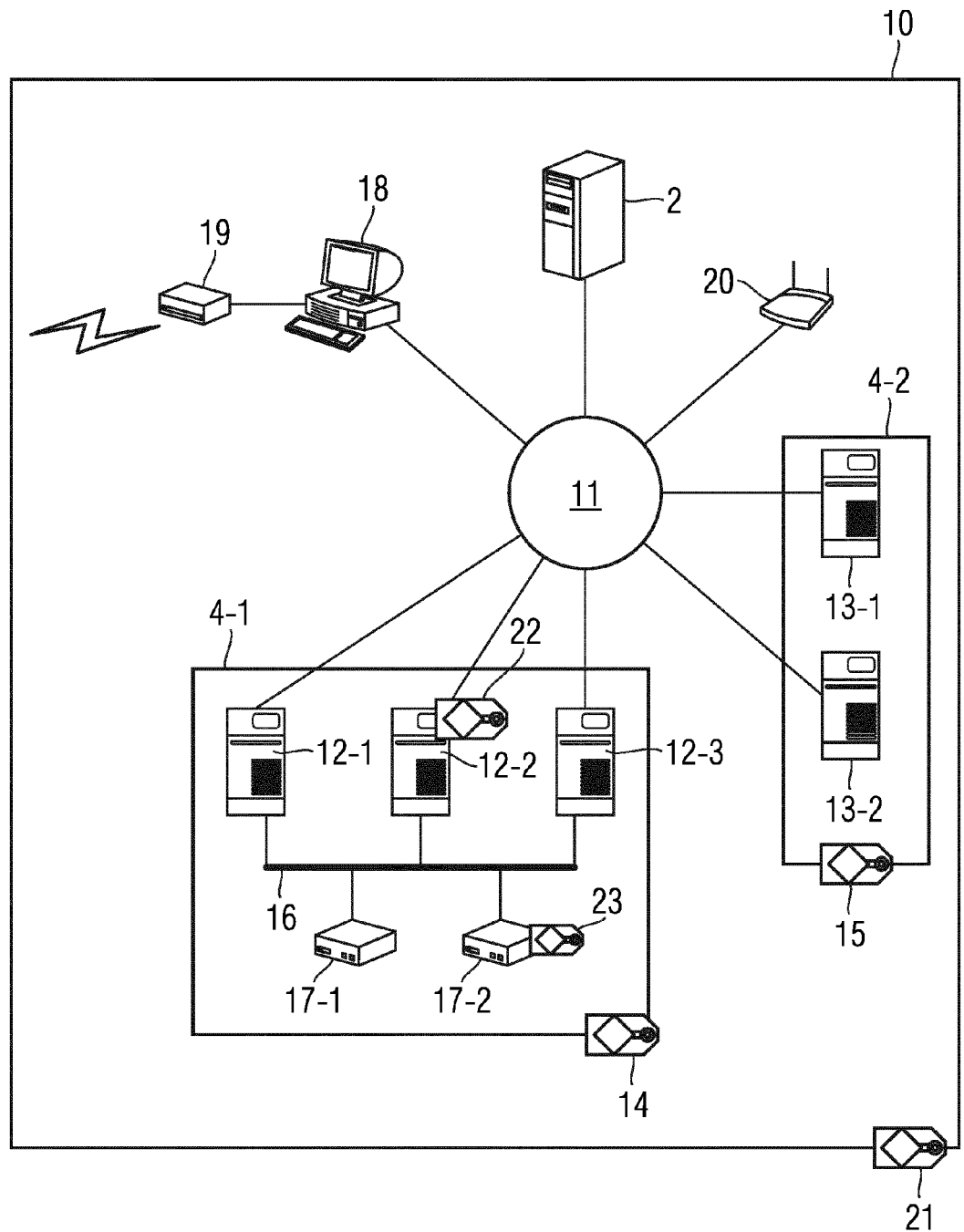
FIG. 3 shows an exemplary embodiment of another system having a security device for providing a cryptographic key for a field device according to the invention.

FIG. 3 shows another example application for a security device 2 according to the invention. In the example shown in FIG. 3, the security device 2 is located in a substation 10, for example in a transformer house of a power distribution network. The substation 10 has a network 11 to which, in the example shown, different field devices 12-1, 12-2, 12-3 in a first control cabinet 4-1 and other field devices 13-1, 13-2 in a second control cabinet 4-2 are connected. The first control cabinet 4-1 has a tamper sensor 14 and the second control cabinet 4-2 has a tamper sensor 15. In the example shown, the field devices 12-1, 12-2, 12-3 in the first control cabinet 4-1 are connected to one another via a bus, for example an Ethernet bus 16, and are connected to other field devices or control devices 17-1, 17-2 via the bus 16. The network 11 is furthermore connected via a station PC 18 and a modem 19 to a remote server for remote maintenance purposes, for instance. A DCF77 unit 20 is furthermore connected to the network 11 in the example shown. The local network station 10 can for its own protection have another tamper sensor 21 attached, for example, to a door of the local network station. The field devices provided in a control cabinet can additionally have their own tamper sensors attached. For example, the field device 12-2 in the control cabinet 4-1 has a tamper sensor 22 and the device 17-2 has a tamper sensor 23.

A field device has preferably been assigned the tamper sensors that are of relevance when the field device is directly physically accessed. In the example shown in FIG. 3, for example, the tamper sensors 22, 14, 21 are relevant to a physical manipulation carried out on the field device 12-2 because to be able to perform a physical manipulation directly on the field device 12-2 an attacker first has to open the door of the local network station 21 and then break open the control cabinet 4-1.

In a possible variant of the inventive method, different measures are taken depending on the respective tamper event TE. For example when security requirements are especially stringent, all field devices inside the local network station 10 will be classified as being at risk by means of a corresponding manipulation message from the tamper sensor 21 as soon as the local network station 10 is penetrated and will not receive any cryptographic keys or credentials from the security device 2. Alternatively, field devices will not be classified as being at risk by the security device 2 unless they are directly affected. For example, the field devices 12-1, 12-2, 12-3 and the devices 17-1, 17-2 will not be classified as being at risk, then cease receiving cryptographic keys from the security device 2, unless the tamper sensor 14 reports that the corresponding control cabinet 4-1 has been penetrated. In another variant a field device will not be classified as being at risk unless a physical manipulation is detected directly on the field device. In the exemplary embodiment shown in FIG. 3, for example, the field device 12-2 will not be classified as being at risk unless the tamper sensor 22 also reports a tamper event TE to the security device 2 in addition. In this embodiment variant the providing of cryptographic keys for the field device 12-2 will not be blocked until the security device 2 has detected a corresponding manipulation message both from the tamper sensor 21 and from the tamper sensor 14 and additionally from the tamper sensor 22.

In another possible embodiment variant, different measures ensue depending on the different manipulation messages of the tamper sensors assigned to the field device. For example, the security device 2 will initially only be put into an alarm operating mode by a manipulation message from the tamper sensor 21 without any further measures being carried out. If, for example, the control cabinet 4-1 is then manipulated and the security device 2 receives a corresponding manipulation message from the tamper sensor 14, then all field devices contained in said cabinet will be classified as being at risk and will not receive any cryptographic material or the cryptographic keys already handed over will be disabled.

At a third stage it is not for example until a corresponding tamper sensor 22 attached directly to the field device 12-2 reports a manipulation carried out on the respective field device that the sensitive data stored in the field device, in particular cryptographic keys, will be additionally automatically erased by the security device 2. In this embodiment variant there will thus be a multistage response depending on how deeply the attacker has penetrated.

The inventive method or the inventive security device 2 for providing a cryptographic key for a field device is versatile in its application. For example, the security device 2 can be used for monitoring an industrial installation, for example a pipeline, or an energy distribution station, for example a local network station. The inventive security device 2 is furthermore suitable for use in, for example, traffic engineering, for instance in traffic signal controller cabinets and suchlike. Further examples are signal boxes, switches and proceed signals in the railroad sector. The inventive security device 2 is furthermore suitable in particular for monitoring buildings and for other infrastructures where protection is critical.

In a possible embodiment variant, the tamper sensors assigned to different field devices are known to the respective field device or have been coded into the same, and in a specific operating mode are first reported to the security device 2. In a possible embodiment variant, the security device 2 manages a corresponding list of tamper sensors assigned to the respective field devices. In a possible embodiment variant, said list is automatically updated when maintenance activities or repairs are carried out on the respective installation. The inventive security device 2 can also be employed in other areas besides industrial installations, for example in the motor vehicle sector for monitoring manipulations carried out on vehicle components. The security device 2 can communicate with the tamper sensors via a hardwired connection over a network 11, as shown in FIG. 3, or, as shown in FIG. 1, at least partially wirelessly.

The invention claimed is:

1. A security device assembly for providing a cryptographic key for a field device, comprising:
   a security device configured for receiving from at least one tamper sensor assigned to the field device a manipulation message emitted by the at least one tamper sensor upon detecting a physical manipulation carried out on the field device by an attacker accessing the field device;
   said security device being configured to make the cryptographic key available to the field device only if the security device does not receive a manipulation message from the at least one tamper sensor assigned to the field device;
   wherein the at least one tamper sensor is configured to obtain an energy supply for generating the manipulation message to said security device from energy produced during the physical manipulation carried out on the field device by the attacker accessing the field device.

2. The security device assembly according to claim 1, wherein the at least one tamper sensor is connected to said security device wirelessly or hardwired.

3. The security device assembly according to claim 1, wherein said at least one tamper sensor is connected directly to the field device or is attached to a closed housing or control cabinet in which the field device is disposed.

4. The security device assembly according to claim 1, wherein said security device is configured to make the cryptographic key available to the field device when the field device logs onto a network only after the field device has successfully authenticated itself to said security device.

5. The security device assembly according to claim 1, wherein the cryptographic key made available by said security device is used by the field device for encrypting or decrypting messages which the field device exchanges with other field devices or with a gateway node of a network.

6. The security device assembly according to claim 1, wherein said security device includes a reading unit receiving messages from the tamper sensors wirelessly.

7. The security device assembly according to claim 1, wherein the at least one tamper sensor connected to said security device are active or passive sensors for registering physical manipulations carried out on the field device.

8. The security device assembly according to claim 7, wherein the at least one tamper sensor is one or more tamper sensors selected from the group consisting of:
   electric or magnetic switches,
   sensors for registering electromagnetic radiation,
   sensors for registering ion beams,
   temperature sensors for registering changes in temperature,
   proximity sensors for registering an approaching object,
   motion sensors, and
   wire-mesh sensors.

9. The security device assembly according to claim 7, further comprising at least one additional tamper sensor configured for obtaining an energy supply for generating the manipulation message to said security device from a field emitted by said security device.

10. The security device assembly according to claim 1, wherein the at least one tamper sensor assigned to the respective field device is reported to said security device by the field device or said at least one tamper sensor is interrogated by said security device from a database on the basis of a device ID of the respective field device.

11. The security device assembly according to claim 10, wherein said at least one tamper sensor assigned to the field device is coded into a digital device certificate of the respective field device.

12. A method of providing a cryptographic key for a field device, the method which comprises:
   monitoring with one or more tamper sensors a potential physical manipulation carried out on the field device;
   providing a security device; and
   making the cryptographic key available to the field device by the security device only if, within a specified period of time, the security device does not receive from the one or more tamper sensors assigned to the field device a manipulation message reporting a physical manipulation carried out on the field device by an attacker accessing the field device;
   wherein at least one of the tamper sensors obtains energy for generating a manipulation message from energy produced during the physical manipulation carried out on the field device by the attacker accessing the field device.

13. The method according to claim 12, which comprises making the cryptographic key available to the field device by the security device only after successful authentication of the field device to the security device.

14. The method according to claim 12, wherein at least one of the tamper sensors obtains energy for generating a manipulation message from a field radiated by the security device.

15. The method according to claim 12, wherein the cryptographic key made available by the security device is a session key used by the field device for communicating with other field devices or with a gateway of a network.

* * * * *